(12) United States Patent
Ikegame

(10) Patent No.: US 6,826,141 B2
(45) Date of Patent: Nov. 30, 2004

(54) OPTICAL ELEMENT SUPPORTING DEVICE IN AN APPARATUS FOR RECORDING/REPRODUCING INFORMATION

(75) Inventor: Tetsuo Ikegame, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/665,952

(22) Filed: Sep. 18, 2003

(65) Prior Publication Data

US 2004/0057369 A1 Mar. 25, 2004

Related U.S. Application Data

(62) Division of application No. 09/736,550, filed on Dec. 13, 2000, now Pat. No. 6,680,893.

(30) Foreign Application Priority Data

Dec. 17, 1999 (JP) .......................................... 11-359505

(51) Int. Cl.[7] ............................................. G11B 7/00
(52) U.S. Cl. ............................. 369/112.01; 369/112.29; 369/44.22
(58) Field of Search ........................ 369/112.01, 44.26, 369/44.32, 44.14, 117, 118, 112.05, 112.23, 44.24, 112.29, 44.22

(56) References Cited

U.S. PATENT DOCUMENTS

| 4,965,785 A | 10/1990 | Tadokoro et al. |
|---|---|---|
| 5,691,971 A | 11/1997 | Kim |
| 5,774,443 A | 6/1998 | Shibano |
| 6,215,755 B1 | 4/2001 | Snyder et al. |
| 6,339,577 B1 | 1/2002 | Hineno |

FOREIGN PATENT DOCUMENTS

| JP | 4-301226 | 10/1992 |
|---|---|---|
| JP | 7-21565 | 1/1995 |

OTHER PUBLICATIONS

1992 Symposium of the Association of Optics in Kyoto, Japan Title Page & pp. I–VI and p. 34–40, Partial English Language explanation attached.
40th Meeting of the Japan Society of Applied Physics and Related Societies (Spring Meeting, 1993)—English Language translation of paragraphs 29p–B–11 and 20p–B–12 attached.

*Primary Examiner*—Nabil Hindi
(74) *Attorney, Agent, or Firm*—Frishauf, Holtz, Goodman & Chick, P.C.

(57) ABSTRACT

An optical element supporting device has one ends of two parallel plate springs, which are extended in a tangential direction, fixed to a holder, has the other ends thereof fixed to a fixture member, and has a collimator lens locked in an opening of the holder. A base fixed to the bottom of the fixture member has two yokes formed thereon. Magnets each polarized in two directions are fixed to the insides of the yokes. Coils are fixed to two surfaces of the holder opposed to the magnets. A target is fixed to the holder, and a sensor is fixed to the bottom of the base. When a current flows into the coils, electromagnetic force is produced along an optical axis due to the interaction between the coils and the magnets opposed to the coils. This causes the parallel plate springs to loosen. Consequently, the holder, target, collimator lens, and coils move as a whole along the optical axis.

8 Claims, 10 Drawing Sheets

OPTICAL ELEMENT SUPPORTING DEVICE IN AN APPARATUS FOR RECORDING/REPRODUCING INFORMATION

CROSS-REFERENCE TO RELATED APPLICATIONS

The present application is a divisional application of U.S. application Ser. No. 09/736,550, filed Dec. 13, 2000 now U.S. Pat. No. 6,680,893 and claims the benefit of priority under 35 USC 119 of Japanese Patent Applications No. H11-359505, filed Dec. 17, 1999, the entire contents of which are incorporated herein by reference.

BACKGROUND OF THE INVENTION

1. Field of the Invention

The present invention relates to an optical element supporting device for information recording/reproducing apparatuses. The optical element supporting device supports an optical element included in an information recording and/or reproducing apparatus for recording and/or reproducing information in or from a recording medium, for example, a magneto-optical disk, a write-once optical disk, a phase change optical disk, a CD-ROM, a digital video disk (DVD), or an optical card.

2. Description of the Related Art

In recent years, a three-dimensional optical recording medium has come to light as one of promising super high-recording density optical recording media that are of a new generation succeeding the generation of such optical recording media as a magneto-optical disk, a write-only disk, a phase change disk, a CD-ROM, a DVD, and an optical card.

The conventional optical recording media are designed to have information recorded two-dimensionally on a recording layer. In contrast, when it comes to the three-dimensional optical recording medium, information is not only recorded two-dimensionally (on a planar basis) on a recording layer whose thickness is larger than a depth of focus offered by a laser, but also recorded in the depth direction of the recording layer. Therefore, if information is recorded on one hundred strata in the depth direction in the three-dimensional recording medium, a recording density that is one hundred times larger than a currently available recording density can be attained readily.

Study reports on such a three-dimensional optical recording medium have been carried in, for example, a collection of notes (P.39–P.40) prepared for lectures given at the 1992 Symposium of the Association of Optics in Kyoto, Japan and a collection of notes (29p-B-11 and 29p-B-12) prepared for lectures given at the 40th Meeting of the Japan Society of Applied Physics and Related Societies. However, the reported recording media are not intended to record or reproduce information in the form of a disk.

Moreover, for example, Japanese Unexamined Patent Publication No. 4-301226 has described an information recording/reproducing apparatus for recording and/or reproducing information in or from a disk-like optical recording medium having a guiding surface and a plurality of recording surfaces.

According to the prior art, two beams are employed, that is, a guiding beam to be irradiated to the guiding surface and a scanning beam to be irradiated to the plurality of recording surfaces. Two spots of the beams formed on the optical recording medium are advanced in a direction orthogonal to a direction of focus. Thus, the scanning beam is guided and information is recorded or reproduced. The guiding beam is positioned on a guiding track, while the scanning beam is positioned on a recording track on any of the plurality of recording surfaces.

Since the scanning beam must be positioned on any of the plurality of recording surfaces, the prior art employs a direction-of-optical axis shifter 104 composed of, as shown in FIG. 14, lenses 101 and 102 and a correcting element 103. Specifically, the lens 102 is moved along an optical axis in order to control the position of the scanning beam relative to the guiding beam in the direction of the optical axis.

Furthermore, the aforesaid patent publication has described an apparatus for recording or reproducing information by positioning a light spot on each of multiple recording layers of an optical recording medium. When this kind of optical recording medium is used for multilayer recording, the lens 102 is moved along an optical axis of an optical system including the lens to a position optimal for each recording apparatus. Assume that the focal length of an objective lens through which light forming a spot is irradiated to the optical recording medium is 3 mm and the focal length of the lens is 12 mm. In this case, an interlayer space between adjoining ones of the multiple recording layers shall be 10 $\mu$m and the number of multiple recording layers shall be ten. For causing the light spot to sweep the ten layers, the lens must be moved a length calculated as 9 layers$\times$10 $\mu$m$\times(12/3)^2$=1440 $\mu$m.

As a supporting device for the lens 102, a device for supporting the lens using two parallel cantilevered plate springs is generally adopted. When this kind of supporting device is employed, if the lens is moved along the optical axis, the springs loosen. This causes a movable assembly to move in a direction in which the springs are extended. Consequently, the lens 102 is displaced perpendicularly to the optic axis of the lens 101 in the direction of extension of the springs. The ray axis of light emitted from the lens 102 slopes in the direction of extension of the springs. This poses a problem in that the position of the scanning beam relative to the guiding beam on a recording medium is changed in a direction orthogonal to the ray axis of the scanning beam.

For minimizing the change in the relative position, the springs should have a sufficiently large length. However, this leads to an increase in the size of the supporting device.

SUMMARY OF THE INVENTION

An object of the present invention is to provide an optical element supporting device for information recording/reproducing apparatuses. The optical element supporting device is designed so that when an optical element is moved, even if the relative positions of two light spots formed through an objective lens are changed in a direction parallel to a direction of focus, a deviation of one of the light spots from the other light spot in a direction of tracking can be minimized.

According to the present invention, an optical element supporting device for information recording/reproducing apparatuses includes a light source, an objective lens, an optical element, and a support member. The light source irradiates a light beam. The light beam irradiated from the light source forms at least one light spot on a recording medium after passing through the objective lens. The optical element routes the light beam irradiated from the light source to the objective lens. The supporting member supports the optical element so that the optical element can move in a first direction. The supporting member is extended so that when the optical element is moved in the first direction, the position of the light spot in a direction of focus will be changed, and the light spot will travel in a direction substantially parallel to the recording tracks of the recording medium.

Other features and advantages of the present invention will be apparent from the description below.

DESCRIPTION OF THE PREFERRED EMBODIMENTS

Figure 1:
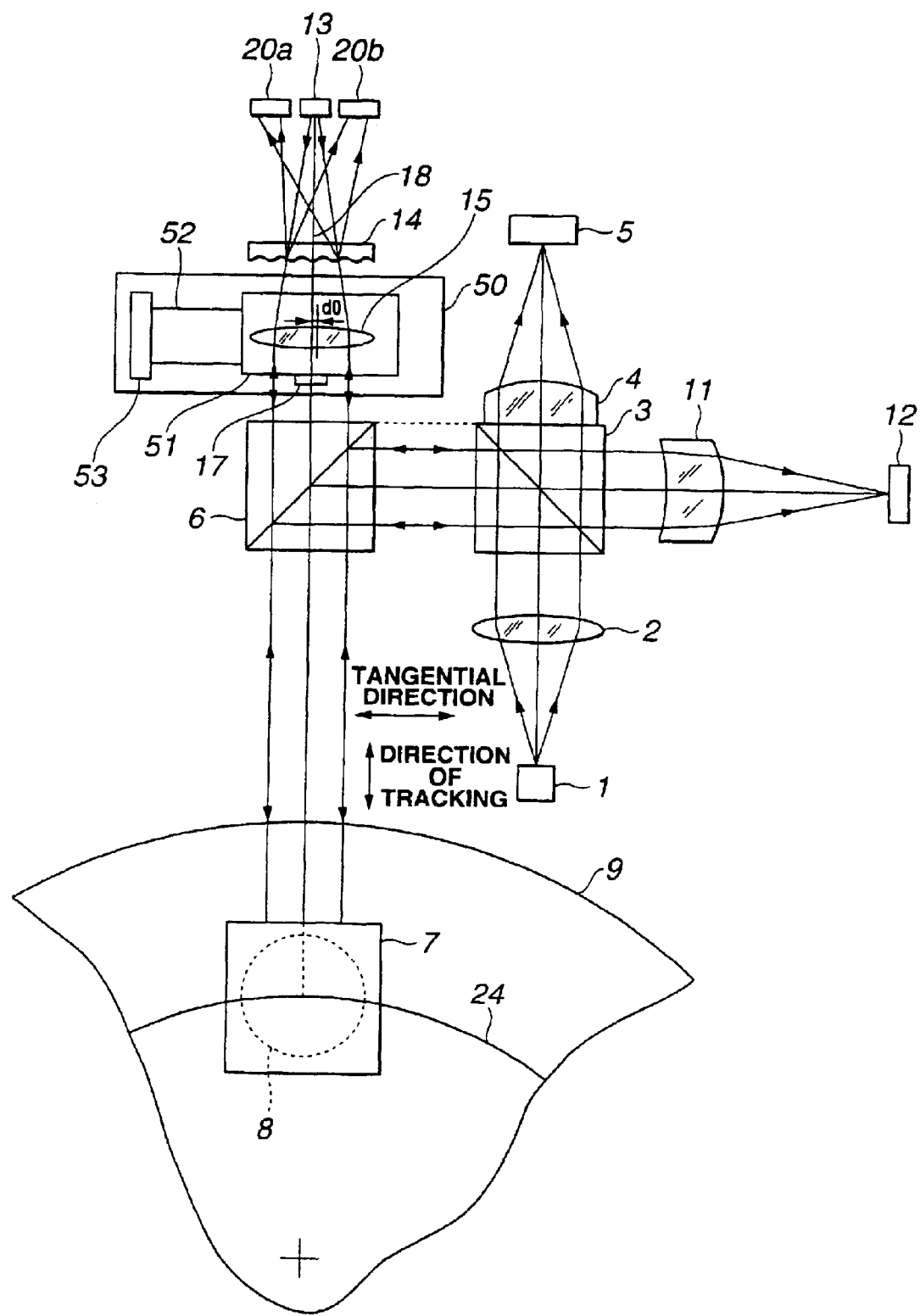
FIG. 1 shows an arrangement of optical elements constituting an optical system included in an information recording/reproducing apparatus in accordance with an embodiment of the present invention.

Referring to the drawings, an embodiment of the present invention will be described below.

(Constituent Features)

As shown in FIG. 1, in an information recording/reproducing apparatus, light emitted from a laser diode (LD) 1 and used to record or reproduce information is light linearly polarized perpendicularly with respect to the sheet of FIG. 1 and collimated by a collimator lens 2. The light collimated by the collimator lens 2 falls on a beam splitter (half mirror) 3. Part of the light is transmitted and the other part thereof is reflected. Light transmitted by the beam splitter 3 is converged at a condenser 4 and routed to a monitor photodiode (PD) 5. The monitor photodiode 5 is used to measure an amount of light emitted from the laser diode 1.

Moreover, light reflected from the beam splitter 3 is reflected from a polarization beam splitter (PBS) 6 and routed to a mirror 7.

Figure 2:
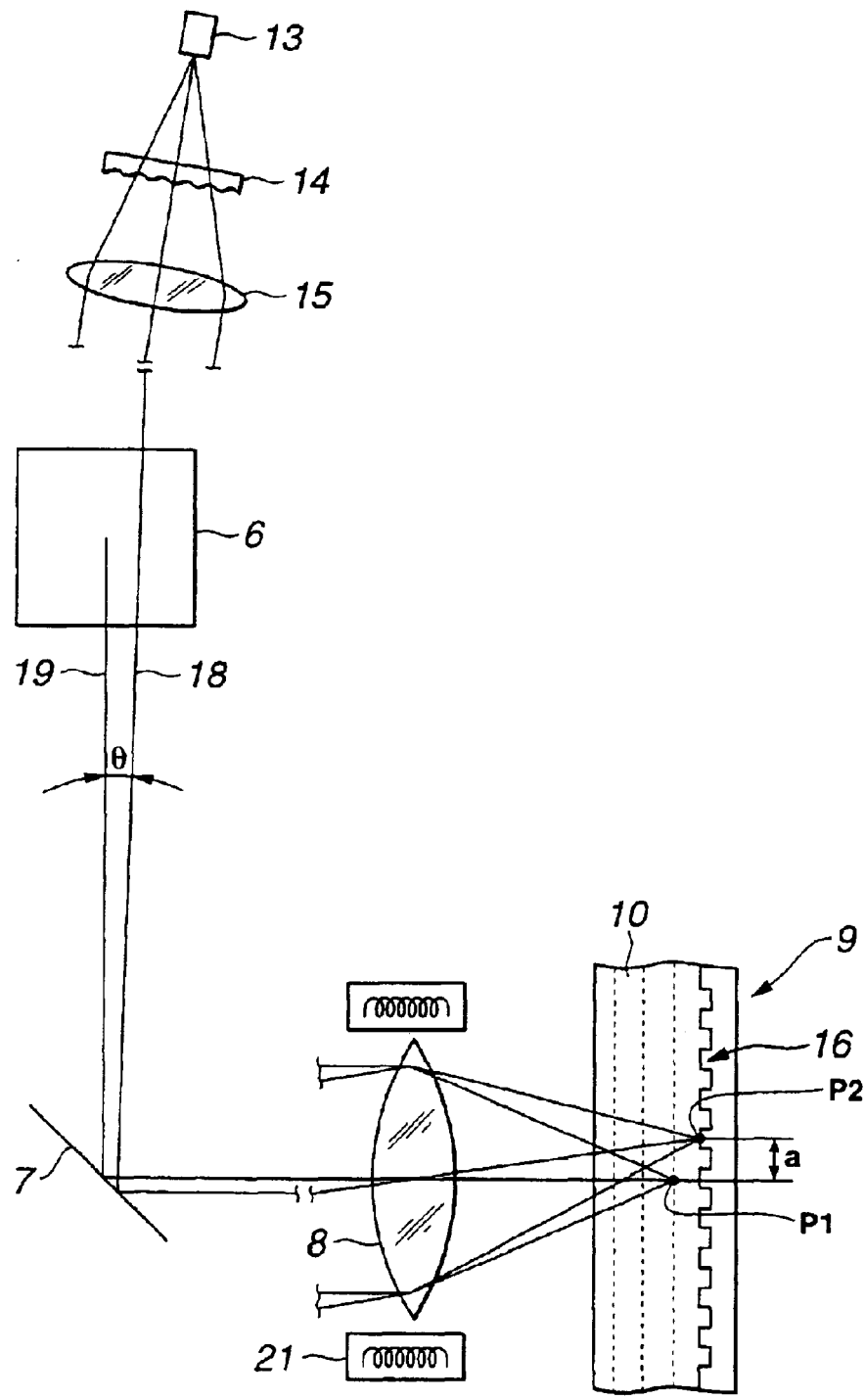
FIG. 2 shows an arrangement of major optical elements of the optical system shown in FIG. 1.

The light reflected from the beam splitter 3 is, as shown in FIG. 2, reflected from the mirror 7 and converged at an objective lens 8. Consequently, a spot P1 is formed in a recording layer of a disk 9.

Light reflected from the spot P1 reversely traces the foregoing light path for incidence and falls on the beam splitter 3. Light transmitted by the beam splitter 3 is, as shown in FIG. 1, converted into converged light, which has undergone astigmatism, by a toric lens (a convex lens plus a cylindrical lens) 11, and then routed to a photodiode 12. The photodiode 12 has a quartered receiving surface and is used to detect a focus error signal and a recording/reproducing signal in the recording/reproducing light forming the spot P1 by utilizing astigmatism.

As shown in FIG. 1, light emitted from a laser diode 13 for emitting guiding light is light linearly polarized parallel to the sheet of FIG. 1. The light is transmitted by a hologram 14, collimated by a collimator lens 15, and transmitted by the polarization beam splitter (PBS) 6. The light is then, as shown in FIG. 2, reflected from the reflecting mirror 7 and converged at the objective lens 8. Consequently, a spot P2 is formed on a guiding surface 16 of the disk 9.

Incidentally, the collimator lens 15 can be, as shown in FIG. 1, moved along an optical axis of an optical system including the collimator lens using a supporting/driving means. A sensor 17 detects the position of the collimator lens 15 along the optical axis. The supporting/driving means consists of two parallel springs, which support the collimator lens 15 so that the collimator lens 15 can move along an optical axis, and a supporting drive unit 50 including coils and magnets. The supporting drive unit 50 will be detailed later.

As shown in FIG. 2, the optical axis 18 of a guiding optical system has a slope θ with respect to the optical axis 19 of a recording/reproducing optical system. The spot P2 of guiding light is therefore formed while being separated by a predetermined distance a from the spot P1 of recording/reproducing light in a direction of tracking (a direction perpendicular to the recording tracks). The distance a ranges, for example, from 5 μm to 100 μm.

Light reflected from the spot P2 is, as shown in FIG. 1, diffracted by the hologram 14 after reversely tracing the light path for incident light. The plus or minus first-order light of the reflected light that is diffracted falls on photodiodes 20a and 20b each having a receiving surface that is segmented into six portions. The plus or minus first-order light is converged light. The plus or minus first-order light is focused ahead of the photodiode 20a, and the other first-order light is focused behind the photodiode 20b. The photodiodes 20a and 20b are used to detect a focus error signal according to a so-called beam size technique, or to detect a tracking error signal or a reproducing signal (track number signal) according to a push-pull technique.

As shown in FIG. 2, the recording/reproducing apparatus has a supporting/driving means 21 for moving the objective lens 8. The objective lens 8 is moved in two directions, that is, in a direction of focus and a direction of tracking by the supporting/driving means 21.

As seen from the above description, the direction of polarization of light emitted from the laser diode 1 and used to record or reproduce information is orthogonal to that of light emitted from the laser diode 13 and used for guiding. The light emitted from the laser diode 1 and the light emitted from the laser diode 13 are mixed and then separated from each other by the polarization beam splitter 6. Consequently, both light emanating from the laser diode 13 and falling on the photodiode 12 and light emanating from the laser diode 1 and falling on the photodiodes 20a and 20b are negligible.

Moreover, light emanating from the laser diode 1 and light emanating from the laser diode 13 are separated from each other in a direction perpendicular to the sheet of FIG. 1. This is because the optical axis 18 of the guiding optical system slopes with respect to the optical axis 19 of the recording/reproducing optical system. The light emanating from the laser diode 1 does not fall on the receiving surfaces of the photodiodes 20a and 20b. In contrast, the light emanating from the laser diode 13 does not fall on the receiving surface of the photodiode 12. Consequently, the recording/reproducing apparatus having the foregoing components can produce a signal less affected with a crosstalk dependent on the photodiodes or noise.

Figure 3:
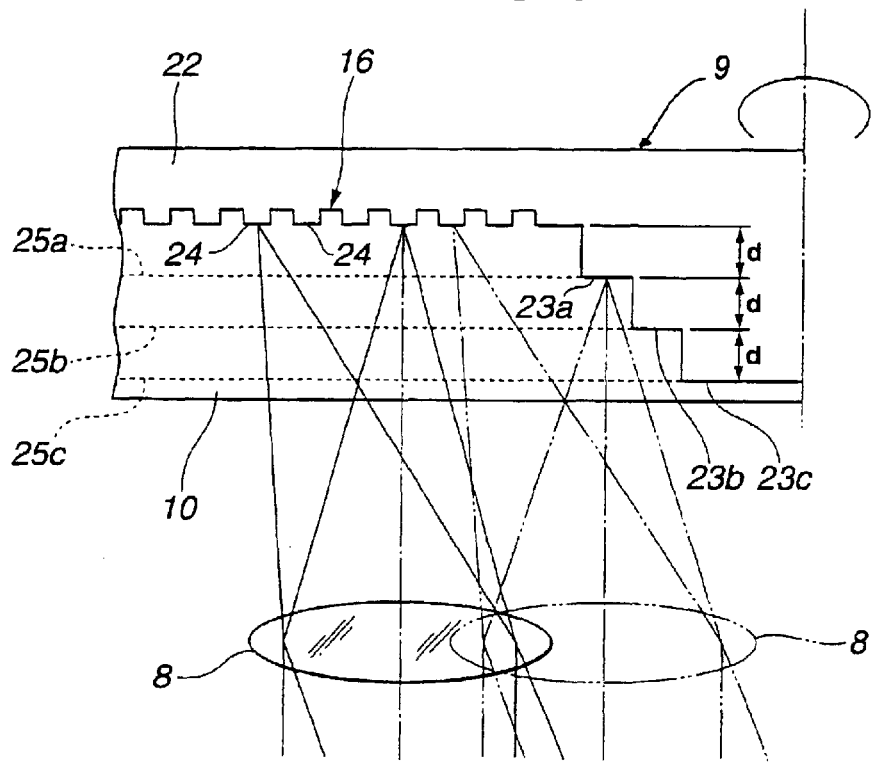
FIG. 3 shows the structure of a disk shown in FIG. 1.

As shown in FIG. 3, the disk 9 has a base layer 22 and a recording layer 10 accumulated on the base layer. The base layer 22 has the guiding surface 16 and three reference surfaces 23a, 23b, and 23c. The guiding surface 16 has tracks 24 that exhibit a high reflectance.

The three reference surfaces 23a, 23b, and 23c are located on the inner circumferential side of the disk 9, and separated from the guiding surface 16 in units of a distance d. In other words, the reference surfaces 23a, 23b, and 23c are located at heights d, 2d, and 3d above the guiding surface 16. For example, the distance d ranges preferably from 2 to 50 $\mu$m, or more preferably from 5 to 15 $\mu$m.

The recording layer 10 has at least one recording surface formed therein apart from the guiding surface 16. For example, three recording surfaces 25a, 25b, and 25c are formed at the same heights as the reference surfaces 23a, 23b, and 23c respectively.

Next, the supporting drive unit 50 will be described below.

As shown in FIG. 1, the collimator lens 15 included in the supporting drive unit 50 is locked in an opening of a holder 51. Two parallel plate springs 52 have one ends thereof fixed to the holder 51 and have the other ends thereof fixed to a fixture member 53. The two parallel plate springs 52 are extended in a tangential direction. Herein, a direction referred to as the tangential direction is such that when the collimator lens 15 is moved in the direction of extension of the plate springs 52, the spot P2 travels on the recording medium in the direction of a tangent to a track on the recording medium. For example, assuming that the plate springs 52 are extended perpendicularly to the sheet of FIG. 1, when the collimator lens 15 is moved in the direction of extension of the plate springs 52, the spot P2 travels on the recording medium in a direction of tracking. In this case, it is said that the plate springs are extended in the direction of tracking.

Figure 4:
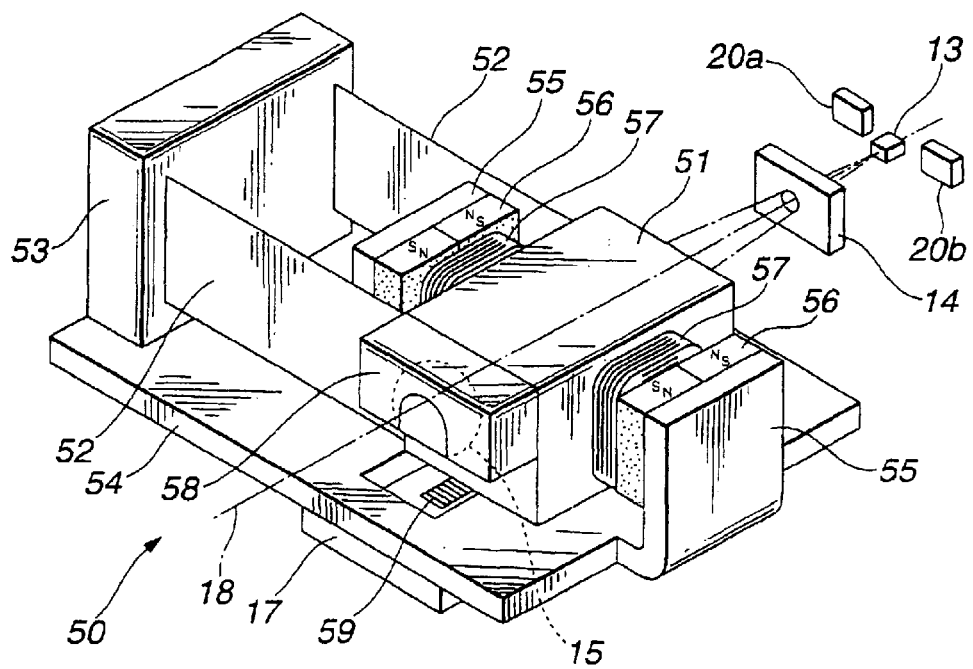
FIG. 4 shows an appearance of a supporting drive unit shown in FIG. 1.
Figure 5:
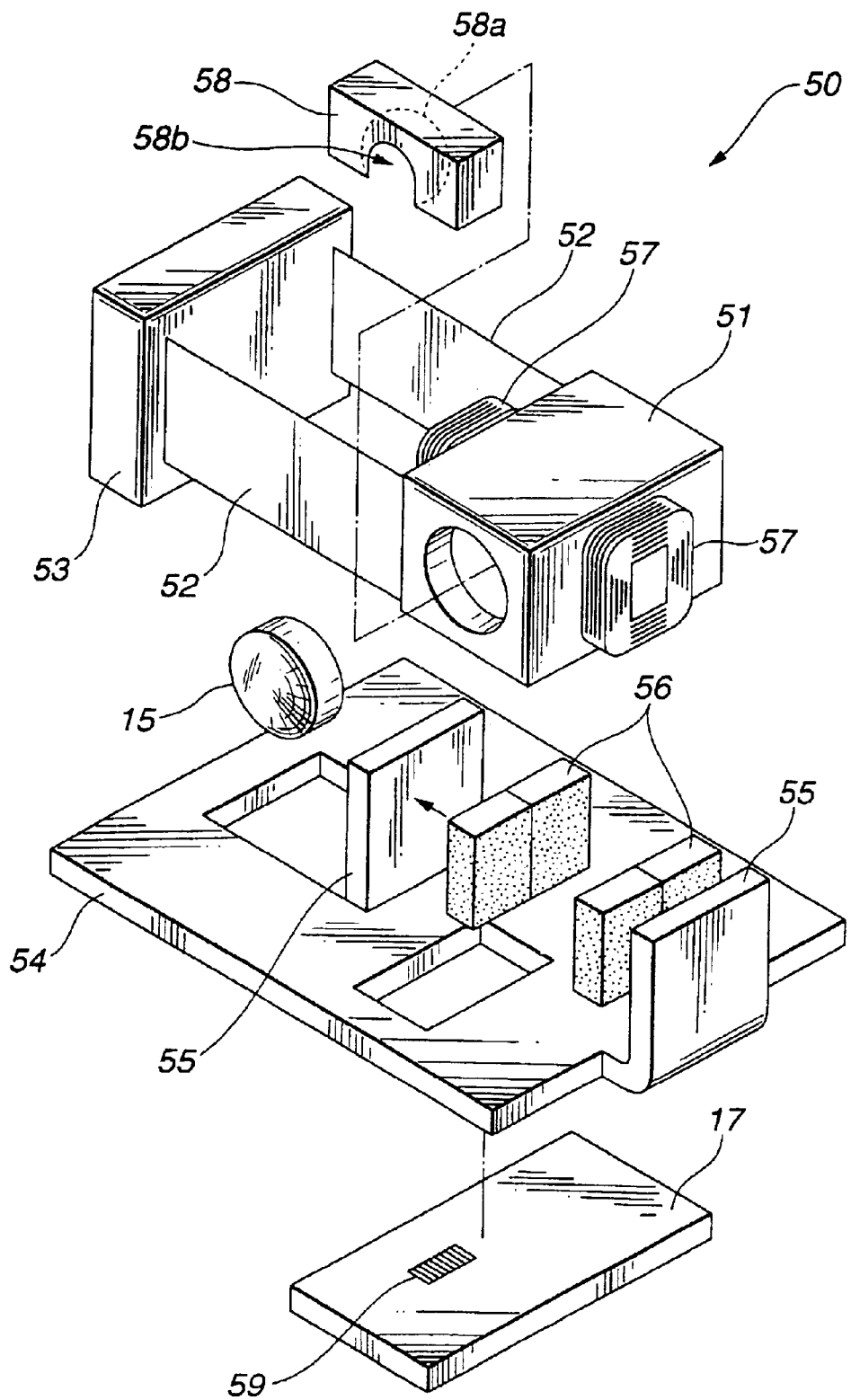
FIG. 5 is a partially exploded view showing the components of the supporting drive unit shown in FIG. 1.

As shown in FIG. 4 and FIG. 5, the bottom of the fixture member 53 is fixed to a base 54 that is an iron plate. Two yokes 55 are formed on the base 54 so that they will face each other to sandwich the holder 51. Magnets 56 each being polarized in two directions are fixed on the inside of the yokes 55. Coils 57 each formed by winding wire about a square frame are fixed to the two surfaces of the holder 51 opposed to the magnets 56. The coils 57 are each positioned so that two sides thereof will lie on two pole faces of each magnet 56. Moreover, a target 58 is fixed to a surface of the holder on the opposite side thereof relative to the laser diode 13. A curved reflecting surface 58a is formed as an inner surface of the target 58. The target 58 is made of a white plastic. The face of the target 58 is formed as the reflecting surface 58a. Alternatively, the face of the target 58 may be plated with nickel or the like in order to improve the reflectance exhibited by the face.

Figure 6:
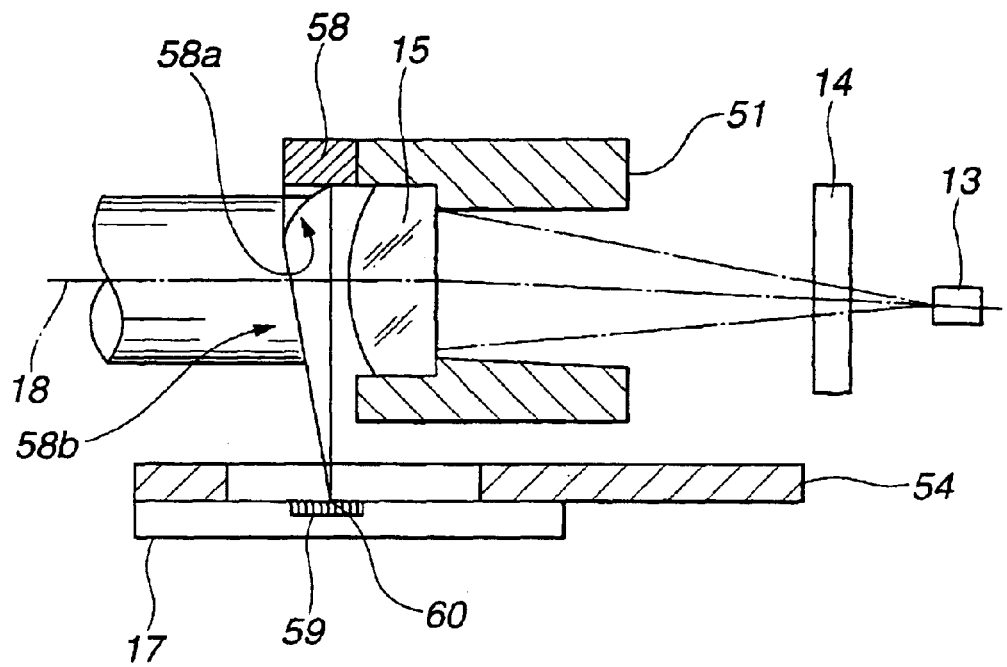
FIG. 6 is a sectional view showing a section cut along the optical axis of a guiding optical system included in the supporting drive unit shown in FIG. 4.

The sensor 17 is fixed to the bottom of the base 54. The sensor 17 has a receiving surface 59 segmented into a plurality of portions along the optical axis 18. The reflecting surface 58a of the target 58 is shaped so that light reflected from the reflecting surface 58a will be, as shown in FIG. 6, converged at a point on the receiving surface 59.

When a current flows into the coils 57, electromagnetic force is produced along the optical axis 18 owing to the interaction between the coils and the magnets 56 opposed to the coils. This causes the springs 52 to loosen. Moreover, the holder 51, target 58, collimator lens 15, and coils 57 are moved as a whole along the optical axis 18.

Figure 7:
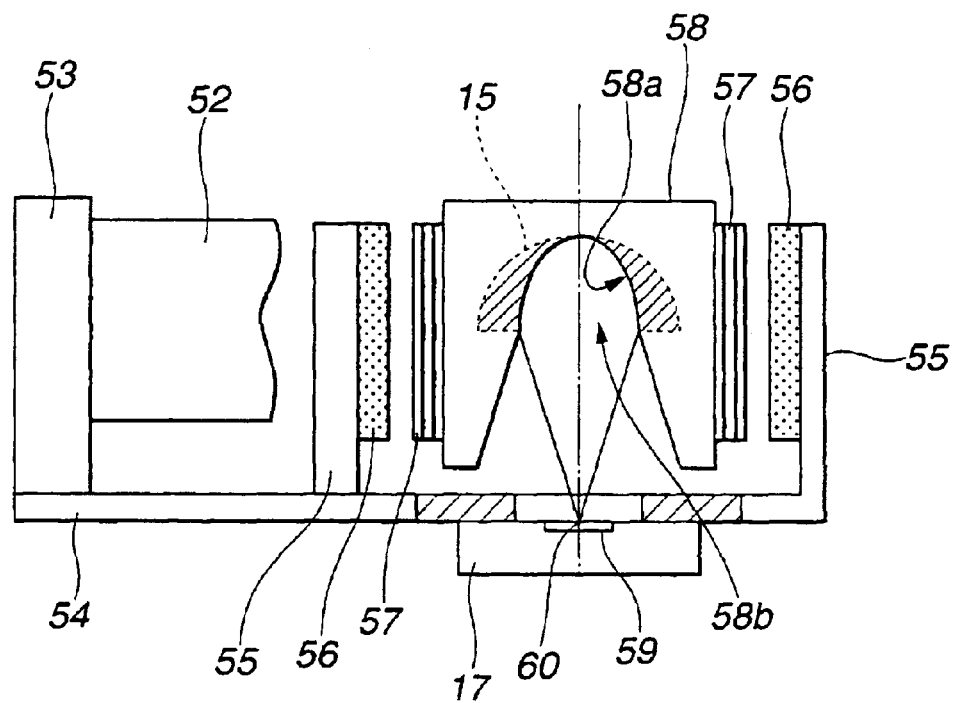
FIG. 7 is a sectional view showing a section cut perpendicularly with respect to the optical axis of the guiding optical system included in the supporting drive unit shown in FIG. 4.

Light emanating from the laser diode 13 is routed to the collimator lens 15, substantially collimated, and routed to the target 58. As shown in FIG. 7, the target 58 has an opening 58b shaped like an upper half of a vertically elongated ellipse. For this reason, out of light emitted from the collimator lens 15, light entering the central vertically-elongated portion of the opening is not intercepted by the target 58, but directed to the objective lens 8. Although the objective lens 8 is moved in the direction of tracking, light necessary at that time is reserved.

(Operations)

In the information recording/reproducing apparatus, the supporting/driving means 21 moves the objective lens 8 according to a focus error signal produced based on the outputs of the photodiodes 20a and 20b. The spot P2 is thus positioned on any of the tracks 24 on the guiding surface 16. Thereafter, the supporting drive unit 50 moves the collimator lens 15 according to a focus error signal produced based on the output of the photodiode 12. The spot P1 is thus positioned on the guiding surface 16.

Thereafter, the information recording/reproducing apparatus reads a track number of the track 24, on which the spot P2 is positioned, according to the outputs of the photodiodes 20a and 20b, and moves the objective lens 8 towards the center of the disk according to the read track number. Consequently, the objective lens 8 is positioned so that, as indicated with imaginary lines, the optical axis of the recording/reproducing optical system will traverse the reference surface 23a and the spot P2 formed by the guiding optical system will spot the track 24.

Thereafter, the collimator lens 15 is moved so that the focus error signal produced based on the output of the photodiode 12 will have a zero level. The spot P1 of recording/reproducing light is thus positioned on the reference surface 23a.

Figure 8:
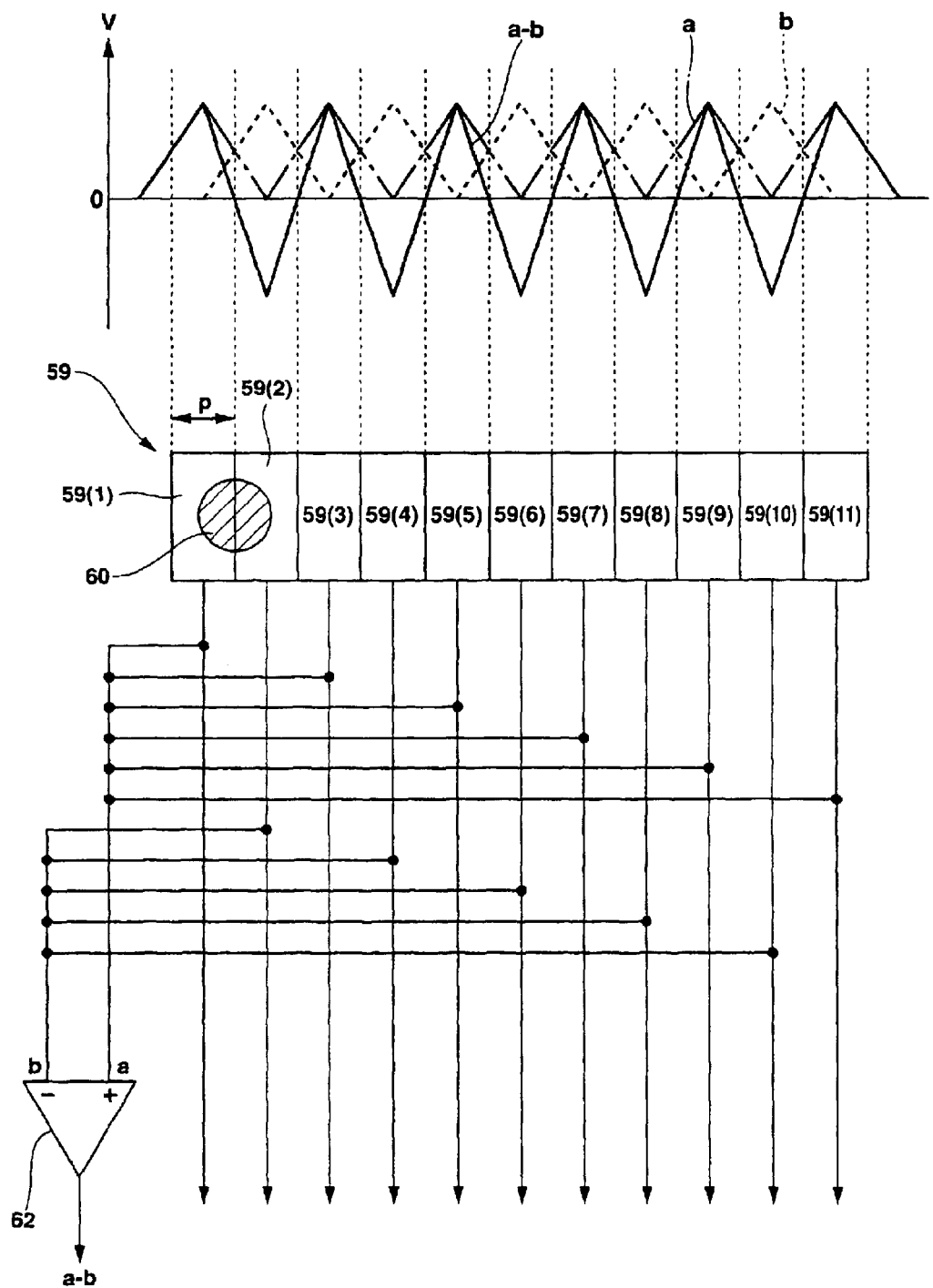
FIG. 8 is an explanatory diagram concerning the operation of a sensor shown in FIG. 4.

Consequently, as shown in FIG. 8, light reflected from the reflecting surface 58a forms a small spot 60 on the receiving surface 59 of the sensor 17. The receiving surface 59 is segmented into eleven portions, that is, receiving portions 59(1) to 59(11). A pitch between adjoining portions shall be p.

A signal is directly acquired at each of the receiving portions 59(1) to 59(11) of the receiving surface 59. In addition, a subtracter 62 provides a differential output signal [a−b] representing a difference between a signal a, which represents the sum of signals acquired at the odd-numbered receiving portions, and a signal b that represents the sum of signals acquired at the even-numbered receiving portions. The differential output signal [a−b] has a zero level when the spot 60 is located on the border between adjoining receiving portions. The differential output signal [a−b] exhibits a sawtooth waveform whose progress is proportional to a length traveled by the spot 60.

When a current flows into the coils 57, the collimator lens 15 is moved along the optical axis 18. This causes the reflecting surface 58a to move along the optical axis 18, and causes the spot 60 to travel on the receiving surface 59 along the optical axis 18. At what position on the receiving surface the spot 60 is located is judged by detecting at which of the receiving portions 59(1) to 59(11), into which the receiving surface is segmented, a signal of a different level is acquired. If the current flowing into the coils 57 is controlled so that the differential output signal [a−b] will have a zero level, the spot 60 is positioned on the border between adjoining receiving portions. The outputs of the receiving portions 59(1) to 59(11) into which the receiving surface is segmented may not be acquired. In this case, a sufficiently large direct current is caused to flow into the coils 57, and the collimator lens 15 is moved to one end of a range of movement. The current is then reduced, and the number of times by which the differential output signal has a zero level is counted. Consequently, at what position the spot 60 is located can be judged from the count.

Moreover, a target level of the differential output signal [a−b] may not be zero but may be deviated by a predetermined magnitude from the zero level. Nevertheless, the position of the collimator lens 15, that is, the relative positions of the spots P1 and P2 in the directions of the optical axes can be controlled finely.

Assume that the collimator lens 15 is moved by a length equivalent to the pitch p along the optical axis 18 towards the laser diode 13. In this case, the position of the spot P2, which is formed through the objective lens 8, relative to the objective lens 8 in the direction of the optical axis changes by a length Z1 determined with a depth magnification dependent on the collimator lens 15 and objective lens 8. At this time, the position of the spot P1 relative to the objective lens 8 in the direction of the optical axis remains unchanged. When the length Z1 is equal to the distance d between adjoining recording surfaces, the spot P2 is fixed to the guiding surface 16 due to focus servo control. Consequently, the spot P1 is positioned on the side of the recording layer near the objective lens 8 while being separated by a length equivalent to the distance d from the spot P2.

Thereafter, the supporting drive unit 50 controls the position of the collimator lens 15 so as to retain an output of the sensor 17 at a certain level. Owing to this control, the position of the spot P2 relative to the spot P1 in the direction of focus is held intact.

Thereafter, the objective lens 8 is moved in the direction of tracking, and the spot P2 is positioned on a desired track 24. Thus, the position of the spot P2, which is formed by the guiding optical system, in the direction of tracking is controlled with a track 24 on the guiding surface 16 as a reference. Consequently, the position of the spot P1 formed by the recording/reproducing optical system is indirectly controlled in the direction of tracking.

The position of the objective lens 8 is controlled in the direction of focus according to a focus error signal produced based on the outputs of the photodiodes 20a and 20b. Consequently, the spot P2 is held focused on any track 24 on the guiding surface 16. In other words, the spot P2 of guiding light is always positioned on the guiding surface 16.

As mentioned above, the position of the collimator lens 15 is controlled in order to retain the output of the sensor 17 at a certain level. The position of the spot P2 relative to the spot P1 in the direction of focus is therefore held intact, that is, the spot P2 is held separated by a length equivalent to the distance d from the spot P1 in the direction of focus. Consequently, the spot P2 is always located on a surface separated by the certain distance d from the guiding surface 5.

This signifies that a surface on which information is recorded during recording is exactly the recording surface 25a separated by the distance d from the guiding surface 16. Moreover, the spot P1 is always positioned on the recording surface 25a during reproduction. The employment of the information recording/reproducing apparatus enables stable recording or reproduction.

Using the information recording/reproducing apparatus, information can be recorded or reproduced in or from the recording surface 25b in the same manner as that in the recording surface 25a. Specifically, first, the objective lens 8 is positioned so that the optical axis 19 of the recording/reproducing optical system traverses the reference surface 23b and the spot P2 formed by the guiding optical system spots a track 24 on the guiding surface 16. After the spot P1 is positioned on the reference surface 23b, the output of the sensor 17 is retained at a certain level so that the position of the spot P1 relative to the spot P2 in the direction of focus will be held intact. Thereafter, the position of the spot P2 on the track 24 of the guiding surface 16 is controlled in the direction of focus. Consequently, the spot P1 is positioned on the recording surface 25b separated by the certain distance 2d from the guiding surface 16. The same applies to recording or reproducing of information in or from the recording surface 25c.

As seen from the above description, the information recording/reproducing apparatus can accurately and stably maintain the relative positions of the spots P1 and P2 despite various discouraging factors that have caused the position of the spot P1 relative to the spot P2 in the direction of focus to change in the past. The factors include a variation of the wavelength of light emanating from the laser diode 1 or laser diode 13, a change in the sensitivity of the supporting/driving means 21 to a driving current, and an offset error occurring in the sensor 17.

As mentioned above, the two parallel plate springs 52 are extended in the tangential direction. Referring to FIG. 1, the collimator lens 15 is located in the center of a range of movement of ±1 mm along the optical axis 18 with the plate springs 52 unloosened. When the collimator lens 15 is seen from a direction perpendicular to the direction of extension of the plate springs 52 shown in FIG. 1, the optic axis of the collimator lens 15 is deviated by a distance d0 from the optical axis 18 of the optical system starting with the laser diode 13 in a direction of its going apart from the plate springs 52.

Figure 9:
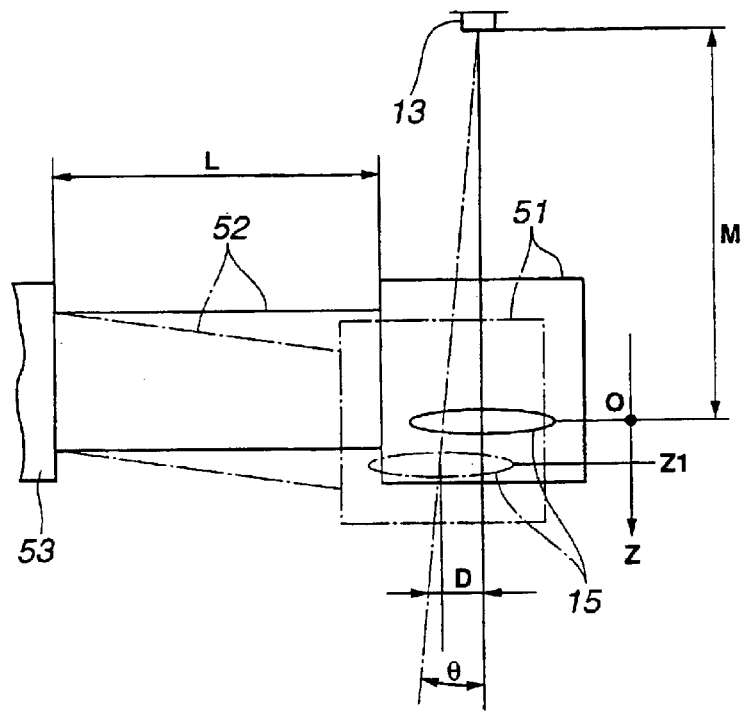
FIG. 9 is the first explanatory diagram concerning the operation of the supporting drive unit shown in FIG. 4.

As shown in FIG. 9, when the collimator lens 15 is moved along the optical axis, the movable ends of the plate springs 52, that is, the collimator lens 15 is moved towards the stationary ends of the plate springs in the direction of extension of the springs.

Figure 10:
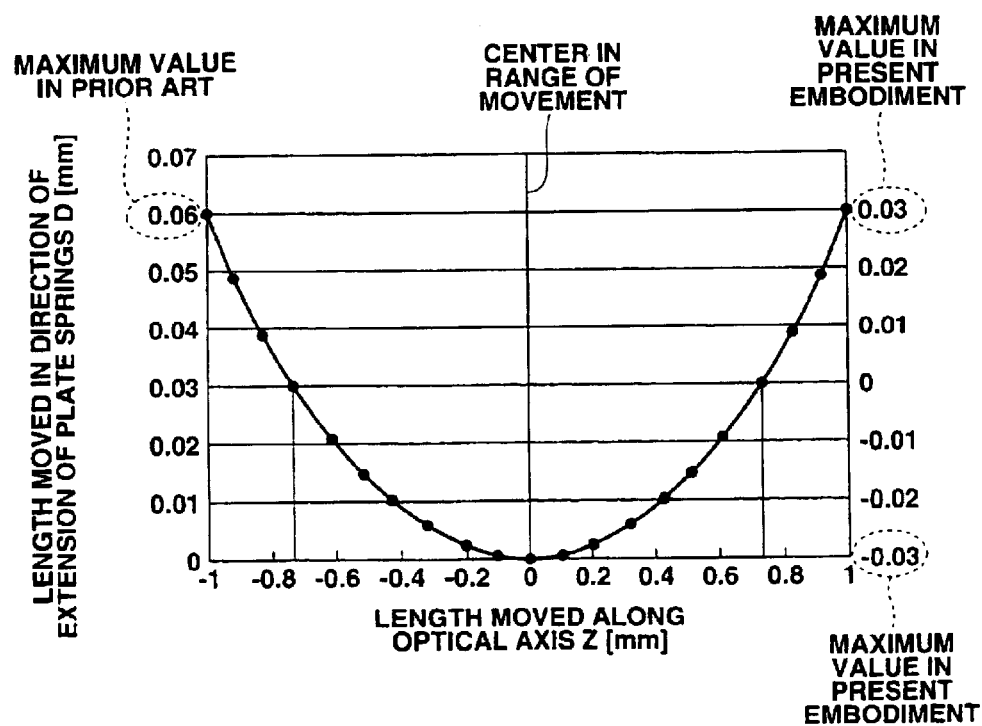
FIG. 10 is the second explanatory diagram concerning the operation of the supporting drive unit shown in FIG. 4.

FIG. 10 is a graph indicating the relationship between a length Z moved along the optical axis by the collimator lens 15 and a length D moved in the direction of extension of the springs that is perpendicular to the optical axis. In this case, the length L of the springs in the direction of extension thereof shall be 10 mm and a range of movement shall be ±1 mm.

Assume that the collimator lens 15 is located in the center of the range of movement along the optical axis and the optic axis of the collimator lens 15 is aligned with the optical axis 18 with the plate springs 52 unloosened. According to the prior art, when the collimator lens 15 is moved +1 mm along the optical axis, the collimator lens 15 is also moved 0.06 mm in the direction of extension of the plate springs 52. Assuming that the focal length M of the collimator lens 15 is set to, for example, 12 mm, light emitted from the collimator lens 15 travels while sloping 0.29° (=tan−1(0.06/12) in the tangential direction. The light then enters the objective lens 8 while sloping in the tangential direction. Assuming that the focal length of the objective lens 8 is 3 mm, the spot P2 is displaced by 15 μm (tan0.29×3) in the tangential direction.

In contrast, according to the present embodiment, as shown in FIG. 1, when the collimator lens 15 is located in the center of the range of movement with the plate springs 52 unloosened, the optic axis of the collimator lens 15 is deviated by a distance d0=0.03 mm from the optical axis in a direction of its parting from the stationary ends of the springs. Therefore, even when the springs are unloosened, the optic axis of the collimator lens 15 is deviated by 0.03 mm from the optical axis as seen from FIG. 10. Nevertheless, a maximum deviation of the optic axis of the collimator lens 15 from the optical axis is 0.03 mm that is a half of the one determined according to the prior art. Consequently, the slope of light emitted from the collimator lens 15 and the length traveled in the tangential direction by the spot p2 are halves of the ones determined according to the prior art.

In other words, despite small plate springs, a length moved along the direction of extension of the springs, which is perpendicular to a desired direction of movement, by an optical element can be minimized. In addition, a variation of the spot P2 caused by coma is minimized. This results in an information recording/reproducing apparatus characteristic of stable recording or reproducing.

Moreover, the direction of travel of the spot P2 is the tangential direction. A change in the relative positions of the spots P1 and P2 in the direction of tracking is very small. Therefore, when the spot P2 is positioned on a track of the guiding surface, the spot P1 will not be displaced from the recording track in the direction of tracking. Consequently, recording or reproducing can be achieved accurately.

According to the present embodiment, a control means is included for controlling the position of the spot P1 relative to the spot P2 in the direction of focus. However, no control means is included for controlling the position of the spot P1 relative to the spot P2 in the direction of tracking. However, as mentioned above, when the position of the spot P1 relative to the spot P2 in the direction of focus is changed, a change in the position of the spot P1 relative to the spot P2 in the direction of tracking is very small. Consequently, recording or reproducing can be achieved accurately.

The optical element is not limited to the collimator lens but may be the objective lens or laser diode. Moreover, a moving mechanism may be a mechanism having magnets included in a movable assembly or a mechanism including a bimetal. The optical element is supported and driven in one direction along the optical axis of an optical system including the optical element. Alternatively, the present embodiment may be adapted to an apparatus in which the optical element is supported and driven in two directions, that is, the direction of the optical axis and the direction of tracking. Even in this case, even when the optical element is moved along the optical axis, the relative positions of light spots formed through an objective lens in the direction of tracking do not change. The position of the optical element in the direction of tracking can therefore be controlled readily.

The present embodiment has been described on the assumption that the support member is realized with the plate springs capable of elastically deforming. Alternatively, the support member may be a link borne by a hinge made of a resin or the like. Furthermore, the present embodiment can be adapted to an apparatus having a cantilevered supporting mechanism or a both ends-fixed spring supporting mechanism having one end of a spring completely immobilized.

According to the present embodiment, the number of recording surfaces layered is three. Alternatively, the number of recording surfaces layered may only one or more than three. The arrangement of optical elements constituting an optical system may be replaced with another arrangement, and the error detecting method may be replaced with another method. Moreover, the present embodiment adopts the multilayer recording method. The present invention is not limited to the recording method but may be implemented in a single-layer recording method.

(Advantages)

As mentioned above, according to the present embodiment, a maximum (undesired) length moved in the direction of extension of the plate springs 52, which serve as a support member, by the collimator lens 15 that is an optical element can be minimized. Consequently, recording or reproducing can be achieved with the relative positions of two light spots, which are formed on a recording medium through the objective lens 8, in the direction of tracking held stable.

According to the present embodiment, the plate springs 52 serving as a support member for supporting the collimator lens 15 that is an optical element are extended parallel to the recording surface of the disk 9 (the surface of a recording medium). Light output from the optical element is routed to the mirror 7 from the direction of tracking, and then routed to an objective lens. Therefore, when the optical element is moved, the direction of extension of the springs for supporting the optical element becomes parallel to the direction of the recording tracks of the moving recording medium. Consequently, displacements of a plurality of light spots in the direction of tracking that is perpendicular to the direction of the recording tracks are minimized. A deviation of a light spot of recording light and/or reproducing light from a recording track is therefore minimized. This results in an apparatus characteristic of stable recording or reproducing.

Figure 11:
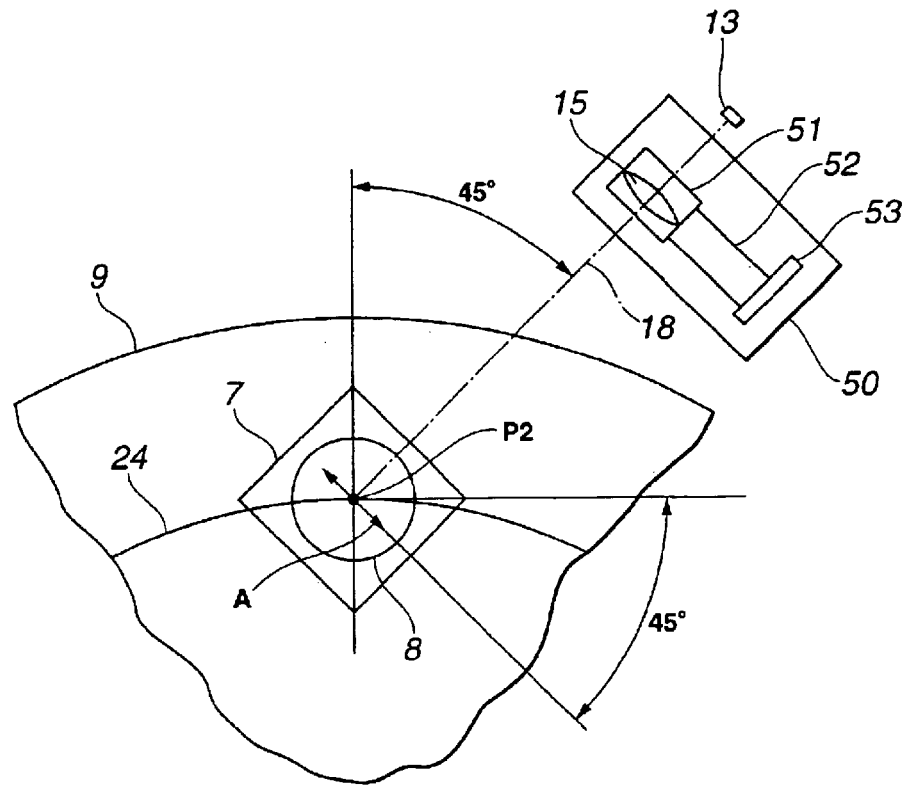
FIG. 11 shows an arrangement of optical elements constituting a first variant of the optical system included in the information recording/reproducing apparatus shown in FIG. 1.

The optical system included in the information recording/reproducing apparatus in accordance with the present embodiment may have optical elements thereof arranged as shown in FIG. 11. Specifically, in a first variant of the optical system included in the information recording/reproducing apparatus, light output from the collimator lens 15 is routed to the mirror 7 from a direction that meets the recording tracks at an angle of 45°. At this time, the plate springs 52 that support the collimator lens 15 are extended in a direction parallel to the disk 9.

According to the first variant, when the collimator lens 15 is moved along the optical axis 18, the light spot P2 formed through the objective lens 8 travels in a direction of arrow A that meets the recording tracks at the angle of 45°. Although the light spot P2 travels even in the direction of tracking, the length traveled in the direction of tracking is equivalent to 1/√2 of the length traveled in the direction of arrow A. Although the length traveled by the light spot is larger than the one traveled by the spot formed by the optical system shown in FIG. 1, the length traveled in the direction of tracking by the light spot is smaller than the one traveled therein by the spot formed by the optical system shown in FIG. 1.

According to the first variant, the direction of travel of the light spot on the disk 9 is a direction that meets the tracks at 45°. The angle at which the direction of travel meets the tracks may be smaller. The case where the angle is 0° refers to the aforesaid embodiment.

Figure 12:
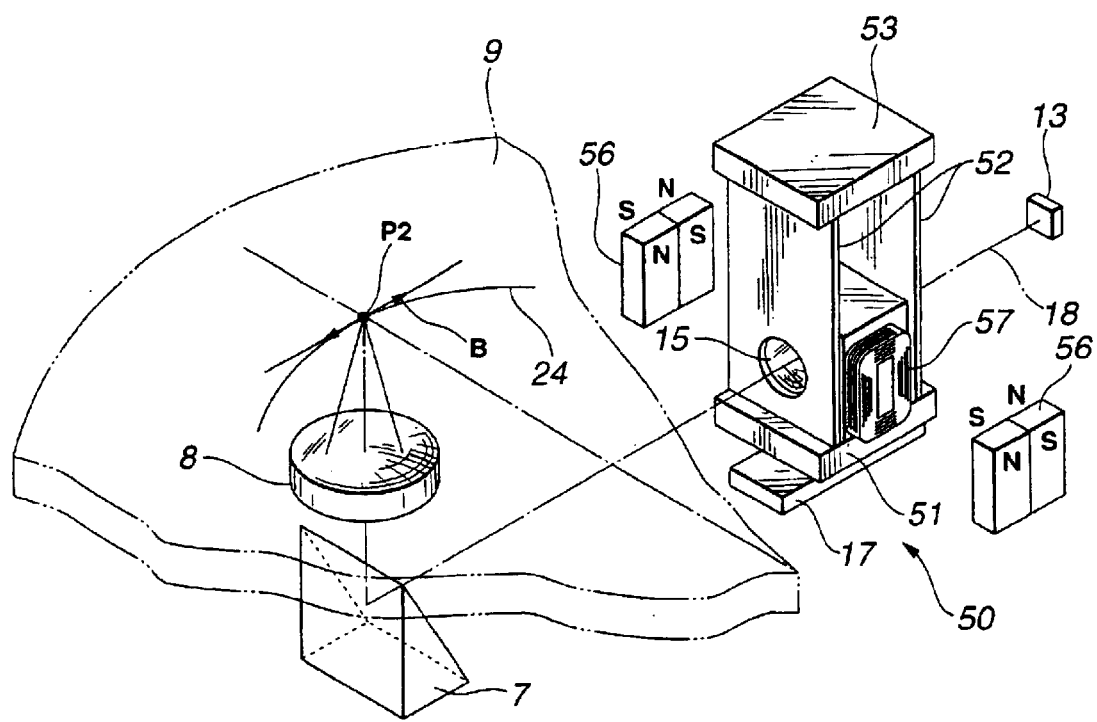
FIG. 12 shows an arrangement of optical elements constituting a second variant of the optical system included in the information recording/reproducing apparatus shown in FIG. 1.

Moreover, the optical system included in the information recording/reproducing apparatus in accordance with the present embodiment may have optical elements thereof arranged as shown in FIG. 12. Specifically, in a second variant of the optical system included in the information recording/reproducing apparatus, as shown in FIG. 12, light output from the collimator lens 15 is routed to the mirror 7 from a direction parallel to the recording tracks. At this time, the plate springs 52 that support the collimator lens 15 are extended in a direction perpendicular to the disk 9.

According to the second variant, when the collimator lens 15 is moved along the optical axis 18, the light spot P2 formed through the objective lens 8 travels in a direction of arrow B that is a direction parallel to the recording tracks. Consequently, the light spot P2 will not travel in the direction of tracking.

Figure 13:
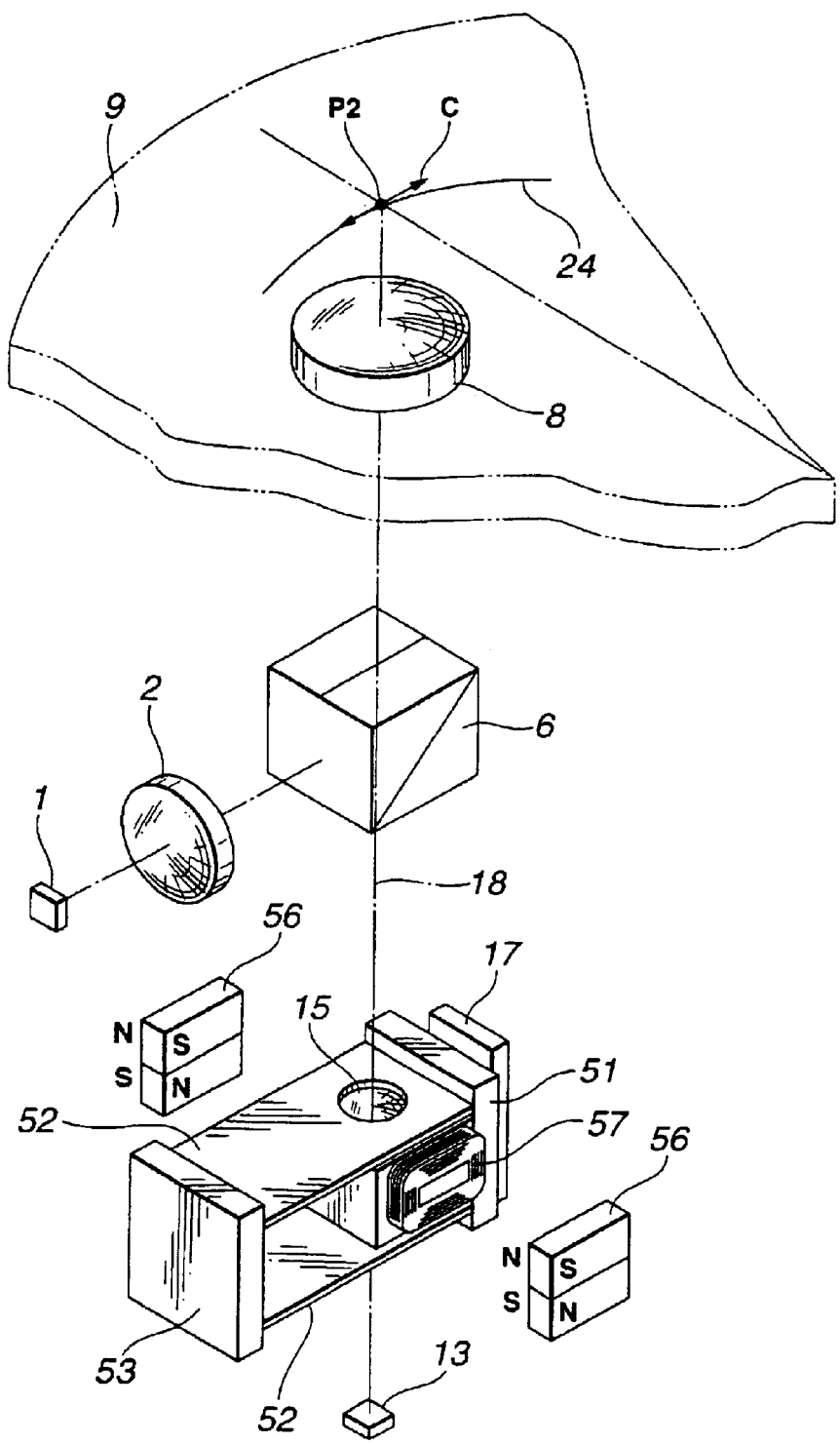
FIG. 13 shows an arrangement of optical elements constituting a third variant of the optical system included in the information recording/reproducing apparatus shown in FIG. 1.
Figure 14:
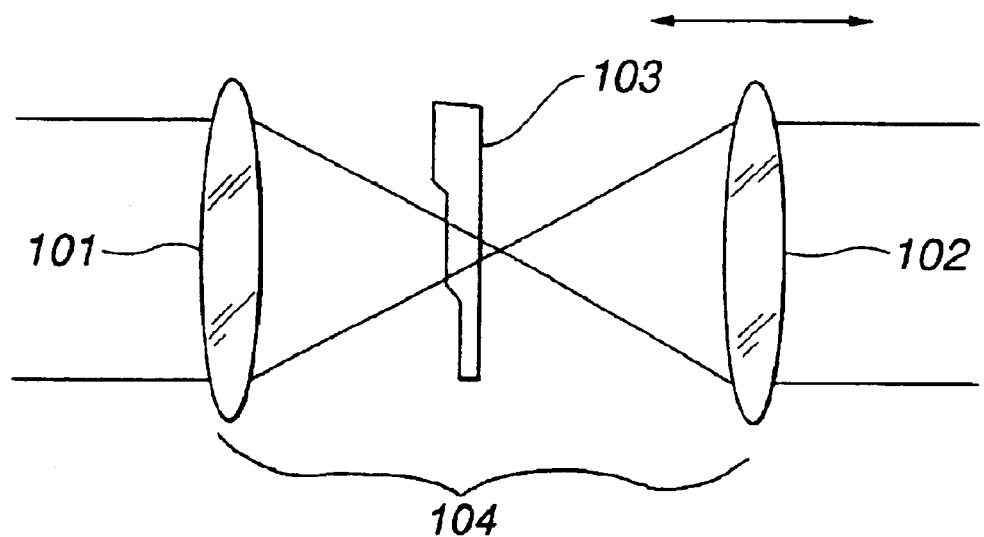
FIG. 14 shows the components of a conventional direction-of-optical axis shifter.

Furthermore, the optical system included in the information recording/reproducing apparatus in accordance with the present embodiment may have optical elements thereof arranged as shown in FIG. 13. Specifically, in a third variant of the optical system included in the information recording/reproducing apparatus, as shown in FIG. 13, light output from the collimator lens 15 is routed to the objective lens 8 from a direction perpendicular to the recording tracks. At this time, the plate springs 52 that support the collimator lens 15 are extended in a direction parallel to the disk 9 and recording tracks alike.

According to the third variant, when the collimator lens 15 is moved along the optical axis 18, the light spot P2 formed through the objective lens 8 travels in a direction of arrow C that is a direction parallel to the recording tracks. Consequently, the light spot P2 will not travel in the direction of tracking.

According to the present invention, it is apparent that a wide range of different embodiments can be formed based on the invention without a departure from the spirit and scope of the invention. This invention will be limited to the appended claims but not restricted to any specific embodiment.

What is claimed is:

1. An optical element supporting device for information recording/reproducing apparatuses comprising:
   a light source for irradiating a light beam;
   an objective lens through which the light beam irradiated from said light source forms at least one light spot on a recording medium;
   an optical element for routing the light beam irradiated from said light source to said objective lens; and
   a support member for supporting said optical element so that said optical element can move in a first direction, said support member being extended so that when said optical element is moved in the first direction, a position of the light spot formed on the recording medium in a direction of focus will be changed, and the light spot will travel in a direction substantially parallel to recording tracks of said recording medium.

2. An optical element supporting device for information recording/reproducing apparatuses according to claim 1, wherein the light beam output from said optical element falls on a mirror from a direction of tracking, light reflected from the mirror falls on said objective lens, and said support member extends in a direction parallel to said recording medium.

3. An optical element supporting device for information recording/reproducing apparatuses according to claim 1, wherein the light beam output from said optical element falls on a mirror from a tangential direction, light reflected from the mirror falls on said objective lens, and said support member extends in a direction perpendicular to said recording medium.

4. An optical element supporting device for information recording/reproducing apparatuses according to claim 1, wherein the light beam output from said optical element falls on said objective lens from a direction perpendicular to said recording medium, and said support member extends in a direction parallel to said recording medium and in a tangential direction.

5. An optical element supporting device for information recording/reproducing apparatuses according to claim 1, wherein said optical element comprises a collimator lens.

6. An optical element supporting device for information recording/reproducing apparatuses according to claim 5, wherein the light beam output from said optical element falls on a mirror from a direction of tracking, light reflected from the mirror falls on said objective lens, and said support member extends in a direction parallel to said recording medium.

7. An optical element supporting device for information recording/reproducing apparatuses according to claim 5, wherein the light beam output from said optical element falls on a mirror from a tangential direction, light reflected from the mirror falls on said objective lens, and said support member extends in a direction perpendicular to said recording medium.

8. An optical element supporting device for information recording/reproducing apparatuses according to claim 5, wherein the light beam output from said optical element falls on said objective lens from a direction perpendicular to said recording medium, and said support member extends in a direction parallel to said recording medium and in a tangential direction.

* * * * *